(12) United States Patent
Takeo et al.

(10) Patent No.: US 8,467,149 B2
(45) Date of Patent: Jun. 18, 2013

(54) SPIN TORQUE OSCILLATOR AND MAGNETIC RECORDING APPARATUS

(75) Inventors: Akihiko Takeo, Kunitachi (JP); Norihito Fujita, Fuchu (JP); Mariko Kitazaki, Kawasaki (JP); Katsuhiko Koui, Yokohama (JP); Hitoshi Iwasaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 8 days.

(21) Appl. No.: 13/218,297

(22) Filed: Aug. 25, 2011

(65) Prior Publication Data

US 2012/0134048 A1    May 31, 2012

(30) Foreign Application Priority Data

Nov. 26, 2010 (JP) ................................. 2010-263981

(51) Int. Cl.
  *G11B 5/31* (2006.01)
(52) U.S. Cl.
  USPC ........................................................ 360/125.3
(58) Field of Classification Search
  USPC ........................................................ 360/125.3
  See application file for complete search history.

(56) References Cited

U.S. PATENT DOCUMENTS

| 7,709,867 B2 | 5/2010 | Ishikawa et al. | |
|---|---|---|---|
| 7,924,607 B2 | 4/2011 | Yoshikawa et al. | |
| 7,943,974 B2 | 5/2011 | Ishikawa et al. | |
| 7,973,351 B2 | 7/2011 | Marukame et al. | |
| 8,120,875 B2* | 2/2012 | Takagishi et al. | 360/125.31 |
| 8,139,322 B2* | 3/2012 | Yamada et al. | 360/125.3 |
| 8,154,825 B2* | 4/2012 | Takashita et al. | 360/125.71 |
| 8,164,854 B2* | 4/2012 | Takagishi et al. | 360/125.31 |
| 8,164,861 B2* | 4/2012 | Braganca et al. | 360/313 |
| 8,194,361 B2* | 6/2012 | Kudo et al. | 360/324.11 |
| 8,238,060 B2* | 8/2012 | Yamada et al. | 360/125.3 |
| 2007/0086121 A1 | 4/2007 | Nagase et al. | |
| 2008/0112087 A1 | 5/2008 | Clinton et al. | |
| 2009/0201614 A1* | 8/2009 | Kudo et al. | 360/324.11 |
| 2009/0251951 A1 | 10/2009 | Yoshikawa et al. | |
| 2009/0310244 A1 | 12/2009 | Shimazawa et al. | |
| 2010/0109111 A1 | 5/2010 | Shin et al. | |
| 2010/0110592 A1 | 5/2010 | Koui et al. | |

(Continued)

FOREIGN PATENT DOCUMENTS

| JP | 2007-142364 | 7/2007 |
|---|---|---|
| JP | 2008-028362 | 2/2008 |

(Continued)

OTHER PUBLICATIONS

D. Houssameddine et al., "Spin-torque oscillator using a perpendicular polarizer and a planar free layer", Jun. 2007, Nature Materials 6(6), pp. 447-453.

(Continued)

*Primary Examiner* — Mark Blouin
(74) *Attorney, Agent, or Firm* — Knobbe, Martens, Olson & Bear LLP

(57) ABSTRACT

According to one embodiment, a spin torque oscillator includes a field generation layer, a spin injection layer including a first layer and a second layer, and an interlayer interposed between the field generation layer and the spin injection layer, wherein the first layer is interposed between the second layer and the interlayer and includes a (001)-oriented Heuslar magnetic alloy or a (001)-oriented magnetic material having a body-centered cubic lattice structure.

12 Claims, 2 Drawing Sheets

U.S. PATENT DOCUMENTS

| | | |
|---|---|---|
| 2010/0142088 A1* | 6/2010 | Iwasaki et al. ............... 360/110 |
| 2011/0043943 A1 | 2/2011 | Igarashi et al. |
| 2011/0089508 A1 | 4/2011 | Min et al. |
| 2011/0134561 A1* | 6/2011 | Smith et al. ................... 360/59 |

FOREIGN PATENT DOCUMENTS

| | | |
|---|---|---|
| JP | 2008-123669 | 5/2008 |
| JP | 2008-252018 | 10/2008 |
| JP | 2009-054724 | 3/2009 |
| JP | 2009-239121 | 10/2009 |
| JP | 2009-301695 | 12/2009 |
| JP | 2010-080650 | 4/2010 |
| JP | 2010-109372 | 5/2010 |
| JP | 2010-113764 | 5/2010 |
| JP | 2010-238345 | 10/2010 |
| JP | 2011-086944 | 4/2011 |
| WO | WO 2009/133786 | 11/2009 |

OTHER PUBLICATIONS

Office Action dated Sep. 4, 2012 for Japanese Application No. 2010-263981 filed on Nov. 26, 2010.

* cited by examiner ically, the underlayer 11 of Ta having a thickness of 15 nm, the buffer layer 12 of (001)-oriented Al—Ni alloy having a thickness of 5 nm, the second layer 1 of the spin injection layer 13 of (001)-oriented Fe—Pt alloy having a thickness of 10 nm, the first layer 2 of the spin injection layer 13 of (001)-oriented $Co_2MnSi$ alloy having a thickness of 3 nm, the interlayer 14 of Cu having a thickness of 2 nm, the field generation layer 15 of Fe—Co alloy having a thickness of 15 nm, and the cap layer 16 of Ta having a thickness of 2 nm are stacked from the main magnetic pole 10 side. In the spin torque oscillator 100 according to FIG. 1, Heusler magnetic alloy is used as the first layer 2 of the spin injection layer 13.

SPIN TORQUE OSCILLATOR AND MAGNETIC RECORDING APPARATUS

CROSS-REFERENCE TO RELATED APPLICATIONS

This application is based upon and claims the benefit of priority from Japanese Patent Application No. 2010-263981, filed Nov. 26, 2010, the entire contents of which are incorporated herein by reference.

FIELD

Embodiments described herein relate generally to a spin torque oscillator and a magnetic recording apparatus using the same.

BACKGROUND

As a conventional spin torque oscillator, there is a spin torque oscillator including a field generation layer, an interlayer and a spin injection layer. In such a spin torque oscillator, it is important to reduce a drive current density for beginning a spin torque oscillation, that is, a critical current density.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a spin torque oscillator comprises a field generation layer, a spin injection layer comprising a first layer and a second layer, and an interlayer interposed between the field generation layer and the spin injection layer, wherein the first layer is interposed between the second layer and the interlayer and comprises a (001)-oriented Heuslar magnetic alloy or a (001)-oriented magnetic material having a body-centered cubic lattice structure.

(Spin Torque Oscillator)

Figure 1:
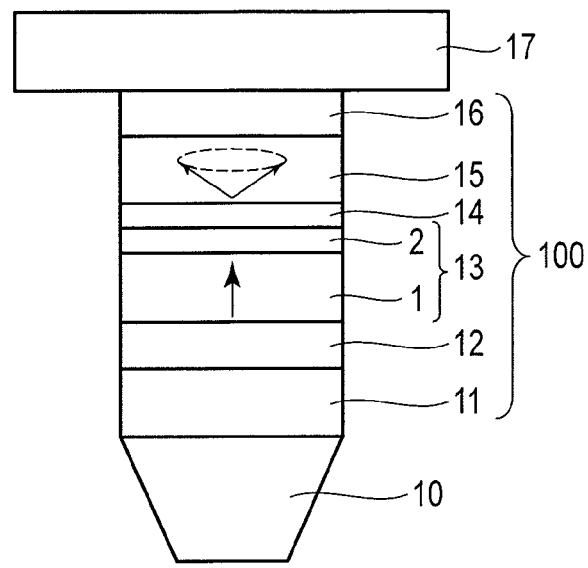
FIG. 1 is a view showing a spin torque oscillator according to a first embodiment.

FIG. 1 is a view of a magnetic recording head including a spin torque oscillator according to a first embodiment when viewed from an air bearing surface. According to FIG. 1, a spin torque oscillator 100 according to the first embodiment is interposed between a main magnetic pole 10 and a trailing shield 17. In the spin torque oscillator 100, an underlayer 11, a buffer layer 12, a spin injection layer 13, an interlayer 14, a field generation layer 15, and a cap layer 16 are sequentially stacked in the order from the main magnetic pole 10 side. Further, the spin injection layer 13 includes a first layer 2 positioned on an interface with the interlayer 14 and a second layer 1 positioned between the first layer 2 and the buffer layer 12.

In the spin torque oscillator 100 according to the first embodiment shown in FIG. 1, specifFIG. 2 is a view of a magnetic recording head including a spin torque oscillator 100 according to a second embodiment when viewed from an air bearing surface. Like FIG. 1, the spin torque oscillator 100 according to the second embodiment is interposed between a main magnetic pole 10 and a trailing shield 17. In the spin torque oscillator 100 according to the second embodiment, an underlayer 11 of Ni—Ta alloy having a thickness of 15 nm, a buffer layer 12 of (001)-oriented Cr having a thickness of 5 nm, a second layer 1 of a spin injection layer 13 of (001)-oriented Fe—Pt alloy having a thickness of 10 nm, a first layer 3 of the spin injection layer 13 of (001)-oriented Fe—Co alloy having a thickness of 3 nm and a body-centered cubic (bcc) lattice structure, an interlayer of Cu 14 having a thickness of 2 nm, a field generation layer 15 of Fe—Co alloy having a thickness of 15 nm, and a cap layer 16 of Ta having a thickness of 2 nm are stacked from the main magnetic pole 10 side. In the spin torque oscillator 100 shown in FIG. 2, the first layer 3 of the spin injection layer 13 is of Fe—Co alloy as a magnetic material having the body-centered cubic (bcc) lattice structure.

Figure 2:
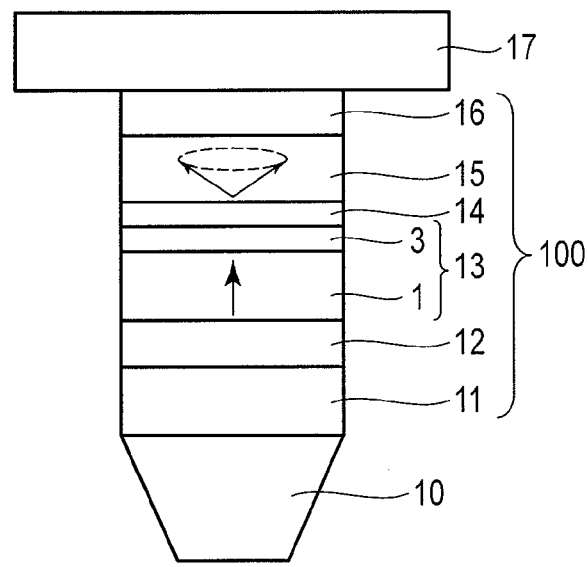
FIG. 2 is a view showing a spin torque oscillator according to a second embodiment.

FIGS. 1 and 2 schematically show how a spin is fixed in a thickness direction in the spin injection layer 13 and how the spin makes a precession movement in the field generation layer 15. The main magnetic pole 10 and the trailing shield 17 apply a gap magnetic field to the spin torque oscillator 100 and pass a current to the spin torque oscillator 100. The spin is injected from the spin injection layer 13 into the field generation layer 15 because of the current so that the spin produces the precession movement and a high-frequency magnetic field is generated. Since the high-frequency magnetic field is applied to a magnetic recording medium, the coercive force of a portion to which the high-frequency magnetic field is applied is reduced and the intensity of a recording magnetic field necessary for writing is reduced.

Further, in the spin torque according to the first embodiment and the second embodiment, the first layer of the spin injection layer 13 includes the (001)-oriented Heusler magnetic alloy and the (001)-oriented magnetic material having the body-centered cubic (bcc) lattice structure, respectively. With the configuration, the magnetization of the spin injection layer 13 is stabilized and a polarization ratio is improved. As a result, the critical current density for spin torque oscillation can be reduced. Note that the expression "(001)-oriented" in the application means that a crystal (001) plane is perpendicular to the thickness direction of a layer.

As the material of the first layer of the spin injection layer 13, the (001)-oriented Heusler magnetic alloy or the (001)-oriented magnetic material having the body-centered cubic (bcc) lattice structure can be used. As the Heusler magnetic alloy, $Co_2MnSi$, $Co_2MnAl$, $Co_2MnGe$, CoCrFeAl, and the like can be used. As the magnetic material having the bcc structure, a magnetic alloy containing at least any one of Fe, Co and Ni and having the bcc structure can be used and, for example, the Fe—Co alloy can be used. Further, as the magnetic alloy having the bcc structure, an alloy containing 25 atomic % or more of Fe in a composition ratio is preferably used. The thickness of the first layer is preferably 3 nm or more to form a good (001)-oriented film.

As the material of the second layer 1 of the spin injection layer 13, it is preferable to use a magnetic material having perpendicular magnetic anisotropy and in particular to use a (001)-oriented magnetic material having perpendicular magnetic anisotropy. Further, as the material of the second layer 1, a magnetic material having a $L1_0$ ordered structure is preferably used. The second layer 1 of (001)-oriented magnetic material makes it easy to form the (001)-oriented first layer on the second layer 1. As the material of the second layer 1, an Fe—Pt alloy, an Fe—Pd alloy, a Co—Pt alloy, a Co—Pd alloy, and the like can be used. These alloys are preferably alloys of 50:50 in atomic ratio. The thickness of the second layer 1 is preferably set to 5 nm or more to obtain stable magnetic characteristics.

As the buffer layer 12, a layer of metal can be defined. The buffer layer 12 is interposed between the underlayer 11 and the second layer 1. The buffer layer 12 preferably consists of a material having the bcc structure. Further, a material of the buffer layer 12 is preferably a (001)-oriented Cr alloy or a (001)-oriented Al—Ni alloy. The buffer layer 12 of the (001)-oriented material makes it easy to form the (001)-oriented second layer 1 on the buffer layer 12. The thickness of the buffer layer 12 is preferably set to 5 to 30 nm.

A layer of metal can be defined as the underlayer 11. The underlayer 11 is interposed between the main magnetic pole 10 and the buffer layer 12. The underlayer 11 preferably consists of a material having an amorphous structure. Further, a material of the underlayer 11 is preferably Ta or an alloy containing Ta, Nb or Zr and Ni. The underlayer 11 of the (001)-oriented material makes it easy to form the buffer layer 12 of the (001)-oriented material having the bcc structure on the underlayer 11. The thickness of the underlayer 11 is preferably set to 10 to 30 nm.

The field generation layer 15 is of a magnetic metal and is preferably of a high-Bs soft magnetic material. For example, as the material of the field generation layer 15, a metal magnetic material containing at least one Fe, Co and Ni can be used. An example of a typical material of the field generation layer 15 is an Fe—Co alloy. In the field generation layer 15, magnetization causes a precession movement, and a high-frequency magnetic field is generated by a dipole magnetic field resulting from the magnetization. The thickness of the field generation layer 15 is preferably set to 5 to 20 nm.

The interlayer 14 is mainly a non-magnetic material having a high spin transmittance and is of, for example, Cu, Au, Ag, or the like. The thickness of the interlayer 14 is preferably set to 2 to 3 nm.

As the cap layer 16, a layer of metal material can be defined. The cap layer 16 is interposed between the field generation layer 15 and the trailing shield 17 and has a role for electrically connecting the field generation layer 15 to the trailing shield 17. For example, Ta having a thickness of 2 to 20 nm can be used as the cap layer 16.

The main magnetic pole 10 is formed of a magnetic metal material. The main magnetic pole 10 is preferably formed of a metal material having a high magnetic permeability, for example, an alloy of a metal selected from the group consisting of Fe, Co and Ni. The main magnetic pole 10 has a function as a magnetic pole for applying a recording magnetic field to a magnetic recording medium and a function as an electrode for causing a drive current to flow to the spin torque oscillator 100.

The trailing shield 17 is made of a magnetic metal material. The trailing shield has a role as a magnetic pole for returning a magnetic field which exits the main magnetic pole 10 and passes through the magnetic recording medium. At the same time, the trailing shield functions also as an electrode and passes the drive current to the spin torque oscillator 100 together with the main magnetic pole 10.

The spin torque oscillator 100 according to the embodiment includes at least the spin injection layer 13, the interlayer 14, and the field generation layer 15 and optionally includes the underlayer 11, the buffer layer 12, and the cap layer 16. Further, the spin torque oscillator 100 may be appropriately provided with a layer other than the layers described above.

(Magnetic Recording Apparatus)

Figure 3:
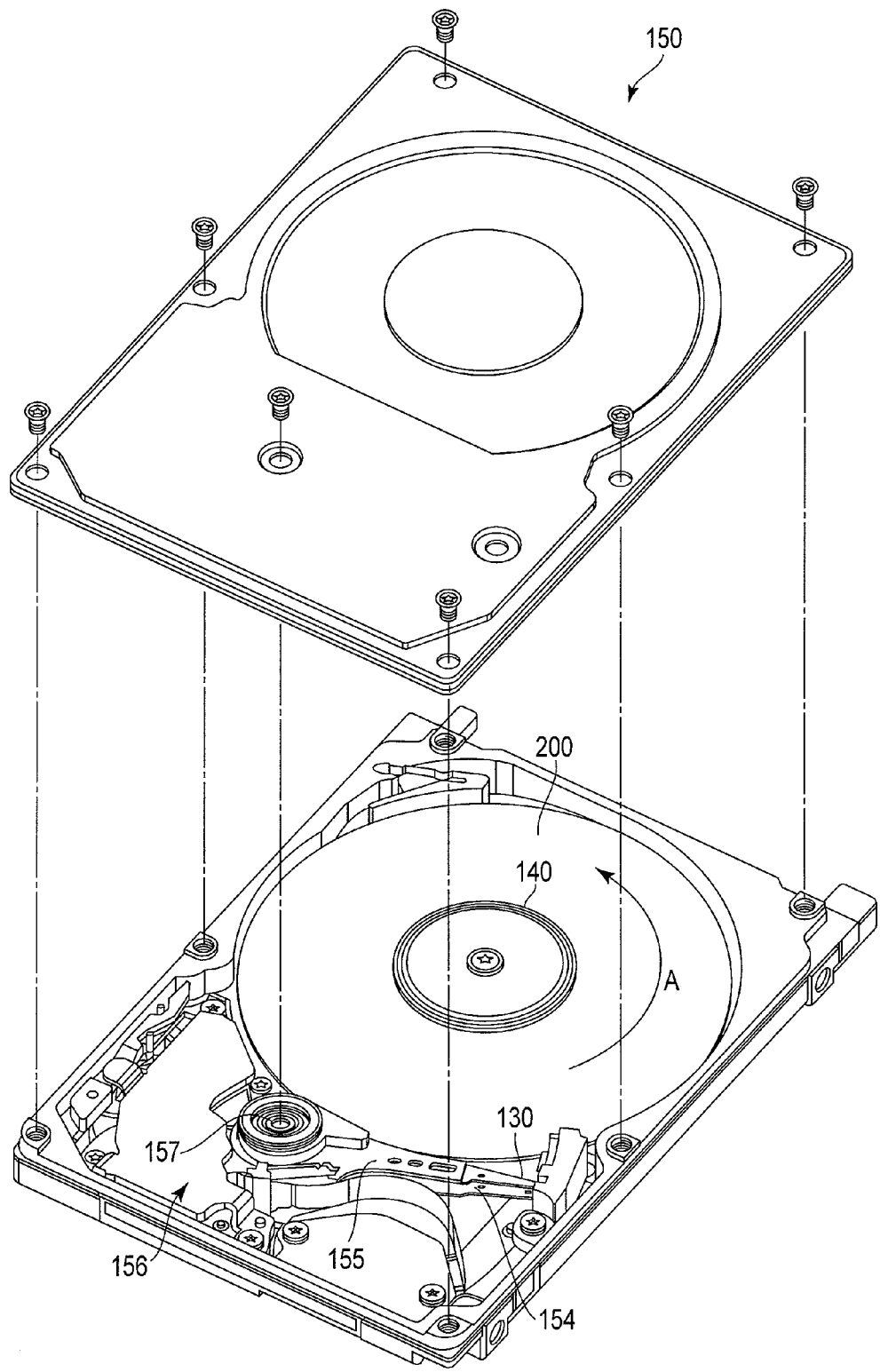
FIG. 3 is an exploded perspective view showing a magnetic recording apparatus according to an embodiment.

FIG. 3 is a perspective view of a magnetic recording apparatus 150 in which a magnetic recording head comprising the spin torque oscillator according to the embodiment is installed.

As shown in FIG. 3, the magnetic recording apparatus 150 is of a type using a rotary actuator. The magnetic recording medium 200 is mounted to the spindle 140, and is rotated in the direction of arrow A by a motor (not shown) that responds to control signals from a drive controller (not shown). The magnetic recording apparatus 150 may comprise a plurality of magnetic recording media 200.

The head slider 130, which is configured to read and write information on the magnetic recording medium 200, is attached to the tip of the film-like suspension 154. The head slider 130 has a magnetic recording head mounted near the tip thereof. During the period in which the magnetic recording medium 200 is kept rotated, the air bearing surface (ABS) of the head slider 130 makes the head slider 130 fly over the surface of the magnetic recording medium 200 at a predetermined height under a balance of pressing force of the suspension 154 and the air pressure exerted on the air bearing surface (ABS) of head slider 130.

The suspension 154 is connected to one end of an actuator arm 155. A voice coil motor 156, a kind of linear motor, is provided on the other end of the actuator arm 155. The voice coil motor 156 may be formed of a magnetic circuit including a driving coil (not shown) wound around a bobbin portion of the actuator arm 155 and a permanent magnet and a counter yoke arranged opposite to each other to sandwich the coil therebetween. The actuator arm 155 is held by ball bearings (not shown) provided at two vertical positions of the pivot 157. The actuator arm 155 can freely swing by the action of the voice coil motor 156. Therefore, the magnetic recording head can access any position on the magnetic recording medium 200.

EXAMPLE

Example

As an example, the spin torque oscillator 100 shown in FIG. 2 was made and a critical current density for oscillating spin torque was examined.

An underlayer 11 of Ni—Ta alloy having a thickness of 15 nm, a buffer layer 12 of (001)-oriented Cr having a thickness of 5 nm, a second layer 1 of a spin injection layer 13 of (001)-oriented Fe—Pt alloy having a thickness of 10 nm, a first layer 3 of the spin injection layer 13 of Fe—Co alloy having a thickness of 3 nm, an interlayer 14 of Cu having a thickness of 2 nm, a field generation layer 15 of Fe—Co alloy having a thickness of 15 nm, and a cap layer 16 of Ta having a thickness of 2 nm were sequentially stacked on a main magnetic pole 10, and finally a trailing shield 17 was formed.

As a result of X-ray diffraction measurement performed on the manufactured spin torque oscillator 100, it was confirmed that the first layer 3 of Fe—Co alloy had a (001)-oriented bcc structure.

Further, as to the manufactured spin torque oscillator 100, a critical current density necessary to make the field generation layer oscillate was measured. As a result, a current density of the order of $10^7$ A/cm$^2$ was found to be necessary.

Comparative Example

As a comparative example, a spin torque oscillator similar to that shown in FIG. 2 was manufactured. However, a $Co_{80}Pt_{20}$ alloy was used as the material of a second layer 1 of a spin injection layer 13.

That is, an underlayer 11 of Ni—Ta alloy having a thickness of 15 nm, a buffer layer 12 of (001)-oriented Cr having a thickness of 5 nm, a second layer 1 of a spin injection layer 13 of $Co_{80}Pt_{20}$ alloy having a thickness of 10 nm, a first layer 3 of the spin injection layer 13 of Fe—Co alloy having a thickness of 3 nm, an interlayer 14 of Cu having a thickness of 2 nm, a field generation layer 15 of Fe—Co alloy having a thickness of 15 nm, and a cap layer 16 of Ta having a thickness of 2 nm were sequentially stacked on a main magnetic pole 10, and finally a trailing shield 17 was formed.

As a result of X-ray diffraction measurement performed on the manufactured spin torque oscillator 100, it was confirmed that the first layer 3 of Fe—Co alloy had a (110)-oriented bcc structure.

Further, as to the manufactured spin torque oscillator, a critical current density necessary to make the field generation layer oscillate was measured. As a result, it was found that a current density of the order of $10^8$ A/cm$^2$ was necessary. That is, the current density was higher than that of the example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A spin torque oscillator comprising:
   a field generation layer in which spins make a precession movement;
   a spin injection layer, in which spins are fixed in a thickness direction, comprising a first layer and a second layer; and
   an interlayer between the field generation layer and the spin injection layer,
   wherein the first layer is between the second layer and the interlayer and comprises a (001)-oriented magnetic material having a body-centered cubic lattice structure or a (001)-oriented Heuslar magnetic alloy.

2. The spin torque oscillator of claim 1, wherein the second layer comprises a (001)-oriented magnetic material with perpendicular magnetic anisotropy.

3. The spin torque oscillator of claim 2, wherein the (001)-oriented magnetic material with perpendicular magnetic anisotropy is a Fe—Pt alloy, a Fe—Pd alloy, a Co—Pt alloy, or a Co—Pd alloy.

4. The spin torque oscillator of claim 2, further comprising a buffer layer, wherein the second layer is between the buffer layer and the first layer, and the buffer layer comprises (001)-oriented Cr or a (001)-oriented Al—Ni alloy.

5. The spin torque oscillator of claim 4, further comprising an underlayer, wherein the buffer layer is between the underlayer and the second layer, and the underlayer has an amorphous structure and comprises Ta or an alloy comprising Ni and one or more of Ta, Nb, and Zr.

6. The spin torque oscillator of claim 1, wherein the first layer comprises the (001)-oriented Heuslar magnetic alloy and the alloy is Co2MnSi, Co2MnAl, Co2MnGe, or CoCrFeAl.

7. The spin torque oscillator of claim 1, wherein the first layer comprises the (001)-oriented magnetic material having a body-centered cubic lattice structure, and the material is an alloy comprising at least one metal selected from the group consisting of Fe, Co, and Ni.

8. The spin torque oscillator of claim 1, wherein the field generation layer comprises a magnetic material.

9. The spin torque oscillator of claim 8, wherein the magnetic material is an alloy comprising at least one metal selected from the group consisting of Fe, Co, and Ni.

10. The spin torque oscillator of claim 1, wherein the interlayer comprises a nonmagnetic material.

11. The spin torque oscillator of claim 10, wherein the nonmagnetic material is Cu, Au, or Ag.

12. A magnetic recording apparatus comprising:
    a magnetic recording medium; and
    a magnetic recording head comprising the spin torque oscillator of claim 1.

\* \* \* \* \*